(12) United States Patent
Takamori et al.

(10) Patent No.: US 11,532,814 B2
(45) Date of Patent: Dec. 20, 2022

(54) LITHIUM NICKEL COBALT COMPOSITE OXIDE POSITIVE ACTIVE MATERIAL, POSITIVE ELECTRODE, AND LITHIUM SECONDARY BATTERY USING THE SAME

(71) Applicants: SUMITOMO CHEMICAL COMPANY, LIMITED, Tokyo (JP); TANAKA CHEMICAL CORPORATION, Fukui (JP)

(72) Inventors: Kenji Takamori, Fukui (JP); Yuichiro Imanari, Ehime (JP); Yusuke Maeda, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 20 days.

(21) Appl. No.: 16/472,161

(22) PCT Filed: Dec. 21, 2017

(86) PCT No.: PCT/JP2017/045980
§ 371 (c)(1),
(2) Date: Jun. 20, 2019

(87) PCT Pub. No.: WO2018/123817
PCT Pub. Date: Jul. 5, 2018

(65) Prior Publication Data
US 2019/0334170 A1     Oct. 31, 2019

(30) Foreign Application Priority Data
Dec. 26, 2016  (JP) .............................. JP2016-251397

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/364* (2013.01); *H01M 4/463* (2013.01); *H01M 4/505* (2013.01); *H01M 10/052* (2013.01)

(58) Field of Classification Search
CPC ...... H01M 4/525; H01M 4/364; H01M 4/463; H01M 4/505; C01G 53/50
(Continued)

(56) References Cited

U.S. PATENT DOCUMENTS

| 6,730,435 B1 | 5/2004 | Nakane et al. | |
| 2005/0008563 A1* | 1/2005 | Naruoka | ............... H01M 4/525 |
| | | | 423/593.1 |

(Continued)

FOREIGN PATENT DOCUMENTS

| CN | 102362377 A | 2/2012 |
| CN | 102832389 A | * 12/2012 |

(Continued)

OTHER PUBLICATIONS

Engelbrecht, Nancy; et al. Rounding Decimal Numbers to a Designated Precision, 1990, U.S. Department of Education (Year: 1990).*

(Continued)

*Primary Examiner* — Sean P Cullen
(74) *Attorney, Agent, or Firm* — McDermott Will & Emery LLP (57) ABSTRACT

A positive electrode active material for lithium secondary batteries includes a lithium composite metal compound containing secondary particles that are aggregates of primary particles which are capable of being doped or dedoped with lithium ions and satisfies all of specific requirements (1) to (4).

12 Claims, 1 Drawing Sheet

(51) Int. Cl.
  *H01M 4/36*    (2006.01)
  *H01M 4/46*    (2006.01)
  *H01M 4/505*   (2010.01)
  *H01M 10/052*  (2010.01)

(58) Field of Classification Search
  USPC .............................................. 429/223, 231.3
  See application file for complete search history.

(56) References Cited

U.S. PATENT DOCUMENTS

| | | | |
|---|---|---|---|
| 2005/0246416 | A1 | 11/2005 | Blomquist |
| 2009/0121179 | A1 | 5/2009 | Shi |
| 2010/0015514 | A1* | 1/2010 | Miyagi ................. H01M 50/46 |
| | | | 429/129 |
| 2011/0250499 | A1 | 10/2011 | Hiratsuka |
| 2012/0015231 | A1 | 1/2012 | Takamori et al. |
| 2013/0130090 | A1 | 5/2013 | Takamori et al. |
| 2014/0087262 | A1 | 3/2014 | Imahashi et al. |
| 2014/0306152 | A1 | 10/2014 | Okamoto |
| 2015/0243971 | A1 | 8/2015 | Cho et al. |
| 2015/0380737 | A1 | 12/2015 | Kawasato et al. |
| 2016/0013471 | A1 | 1/2016 | Kaseda et al. |
| 2016/0164093 | A1 | 6/2016 | Inoue et al. |
| 2016/0218364 | A1 | 7/2016 | Sakai et al. |
| 2016/0240846 | A1* | 8/2016 | Endo ...................... C01G 53/50 |
| 2016/0372749 | A1 | 12/2016 | Iida et al. |
| 2016/0380263 | A1* | 12/2016 | Nakayama ............ H01M 4/366 |
| | | | 429/223 |
| 2017/0012286 | A1* | 1/2017 | Washida ............... H01M 4/505 |
| 2017/0187031 | A1* | 6/2017 | Kurita ................... H01M 4/131 |
| 2017/0288215 | A1 | 10/2017 | Mitsumoto et al. |
| 2017/0352885 | A1 | 12/2017 | Kondo et al. |
| 2017/0358798 | A1 | 12/2017 | Kageura et al. |
| 2018/0331358 | A1 | 11/2018 | Yamaji et al. |
| 2019/0252681 | A1* | 8/2019 | Kaneda ............. H01M 10/0525 |

FOREIGN PATENT DOCUMENTS

| | | | | |
|---|---|---|---|---|
| CN | 105070896 | A | * 11/2015 | ........ H01M 10/0525 |
| CN | 105378987 | A | 3/2016 | |
| CN | 105826548 | A | 8/2016 | |
| CN | 105917500 | A | 8/2016 | |
| EP | 2 144 314 | A2 | 1/2010 | |
| JP | 2001-106534 | A | 4/2001 | |
| JP | 2003-017054 | A | 1/2003 | |
| JP | 2003-187801 | A | 7/2003 | |
| JP | 2010-129471 | A | 6/2010 | |
| JP | 4846309 | B2 | 12/2011 | |
| JP | 4872150 | B2 | 2/2012 | |
| JP | 4984478 | B2 | 7/2012 | |
| JP | 5034305 | B2 | 9/2012 | |
| JP | 2012-230898 | A | 11/2012 | |
| JP | 2013-080603 | A | 5/2013 | |
| JP | 2013-125732 | A | 6/2013 | |
| JP | 2013125732 | A | * 6/2013 | |
| JP | 2013-152909 | A | 8/2013 | |
| JP | 2013-235786 | A | 11/2013 | |
| JP | 2014078500 | A | * 5/2014 | |
| JP | 2015-026455 | A | 2/2015 | |
| JP | 2015-056368 | A | 3/2015 | |
| JP | 5682151 | B2 | 3/2015 | |
| JP | 2015-146185 | A | 8/2015 | |
| JP | 2016-018656 | A | 2/2016 | |
| JP | 2016-026981 | A | 2/2016 | |
| JP | 2016-033854 | A | 3/2016 | |
| JP | 2016-100060 | A | 5/2016 | |
| JP | 2016-127004 | A | 7/2016 | |
| JP | 2018-073686 | A | 5/2018 | |
| WO | 2010/113512 | A1 | 10/2010 | |
| WO | 2014/133063 | A1 | 9/2014 | |
| WO | 2015/111740 | A1 | 7/2015 | |
| WO | 2015/182665 | A1 | 12/2015 | |
| WO | WO-2015182665 | A1 | * 12/2015 | ............ H01M 4/525 |
| WO | 2016/035852 | A1 | 3/2016 | |
| WO | 2016/035853 | A1 | 3/2016 | |
| WO | WO-2016035853 | A1 | * 3/2016 | ......... C01G 45/1228 |
| WO | 2016/104488 | A1 | 6/2016 | |
| WO | 2018/021453 | A1 | 2/2018 | |

OTHER PUBLICATIONS

"oxides." A Dictionary of Chemistry. Eds. Law, Jonathan, and Richard Rennie. : Oxford University Press, . Oxford Reference. Date Accessed Jan. 20, 2022 <https://www.oxfordreference.com/view/10.1093/acref/9780198841227.001.0001/acref-9780198841227-e-3037>. (Year: 2002).*

International Search Report issued in corresponding International Patent Application No. PCT/JP2017/045980, dated Jan. 30, 2018, with English Translation.

Japanese Office Action issued in corresponding Japanese Patent Application No. 2016-251397, dated Jan. 9, 2018, with Engish Translation.

Japanese Office Action issued in corresponding Japanese Patent Application No. 2016-251397, dated May 22, 2018, with Engish Translation.

Japanese Third Party Notification issued in corresponding Japanese Patent Application No. 2018-182065, dated Dec. 22, 2020, with partial English translation.

Korean Third Party Observation issued in corresponding Korean Patent Application No. 10-2019-7017664, dated Nov. 10, 2020, with partial English translation.

Chinese Office Action issued in corresponding Chinese Patent Application No. 201780079180.9, dated Sep. 27, 2021, with partial English translation.

Korean Notification of Reason for Refusal issued in corresponding Korean Patent Application No. 10-2019-7017664, dated Mar. 26, 2022, with English translation.

Chinese Office Action issued in corresponding Chinese Patent Application No. 201780079180.9, dated Apr. 12, 2022, with English translation.

Korean Notification of Reason for Refusal issued in corresponding Korean Patent Application No. 10-2019-7017664, dated Sep. 24, 2022, with English translation.

* cited by examiner

LITHIUM NICKEL COBALT COMPOSITE OXIDE POSITIVE ACTIVE MATERIAL, POSITIVE ELECTRODE, AND LITHIUM SECONDARY BATTERY USING THE SAME

CROSS REFERENCE

This application is the U.S. National Phase under 35 U.S.C. § 371 of international Application No. PCT/JP2017/045980, filed on Dec. 21, 2017, which claims the benefit of Japanese Application No. 2016-251397, filed on Dec. 26, 2016, the entire contents of each are hereby incorporated by reference.

TECHNICAL FIELD

The present invention relates to a positive electrode active material for lithium secondary batteries, a positive electrode for lithium secondary batteries, and a lithium secondary battery.

Priority is claimed on Japanese Patent Application No. 2016-251397, filed on Dec. 26, 2016, the contents of which are incorporated herein by reference.

BACKGROUND ART

A lithium-containing composite metal oxide has been used as a positive electrode active material for lithium secondary batteries. Lithium secondary batteries have already been in practical use for small power sources in mobile phone applications, notebook personal computer applications, and the like and have been tried to be applied to medium-sized and large-sized power sources in automotive applications, power storage applications, and the like. For example, Patent Documents 1 to 6 describe using lithium nickel composite oxides to improve cycle characteristics and charging/discharging capacity.

CITATION LIST

Patent Literature

[Patent Document 1] Japanese Unexamined Patent Application, First Publication No. 2016-33854
[Patent Document 2] PCT International Publication No. WO2014/133063
[Patent Document 3] Japanese Unexamined Patent Application, First Publication No. 2015-26455
[Patent Document 4] Japanese Unexamined Patent Application, First Publication No. 2015-56368
[Patent Document 5] Japanese Unexamined Patent Application, First Publication No. 2013-80603
[Patent Document 6] Japanese Unexamined Patent Application, First Publication No. 2013-152909

SUMMARY OF INVENTION

Technical Problem

However, lithium ion batteries which use conventional lithium-containing composite metal oxide described above as a positive electrode active material for lithium secondary batteries is required for further improvement of battery characteristics.

The present invention has been made in view of the above circumstances, and an object thereof is to provide a positive electrode active material for lithium secondary batteries in which a cycle characteristic is high under high voltage (for example, upper limit voltage is 4.4 V or more in terms of metal lithium) and a positive electrode for lithium secondary batteries and a lithium secondary battery using the same.

Solution to Problem

That is, the present invention includes the inventions of the following [1] to [11].

[1] A positive electrode active material for lithium secondary batteries including a lithium composite metal compound containing secondary particles that are aggregates of primary particles which are capable of being doped or dedoped with lithium ions, the positive electrode active material for lithium secondary batteries satisfying all of the following requirements (1) to (4), (1) the lithium composite metal compound has a crystal structure of $\alpha$-NaFeO2 type which is represented by Composition Formula (A) described below, $$Li[Li_x(Ni_aCo_bMn_cM_d)_{1-x}]O_2 \qquad (A)$$

(in Composition Formula (A), $-0.1 \leq x \leq 0.2$, $0.7 \leq a < 1$, $0 < b \leq 0.3$, $0 \leq c \leq 0.2$, $0 \leq d \leq 0.1$ and $a+b+c+d=1$ are satisfied, and M represents one or more elements selected from the group consisting of Mg, Ca, Sr, Ba, Zn, B, Al, Ga, Ti, Zr, Ge, Fe, Cu, Cr, V, W, Mo, Sc, Y, La, Nb, Ta, Tc, Ru, Rh, Pd, Ag, Cd, In, and Sn), (2) when the positive electrode active material for lithium secondary batteries is measured in powder X-ray diffraction measurement using CuK$\alpha$ radiation, a ratio A/B of an integrated intensity A of a peak within a range of $2\theta=18.7\pm1°$ and an integrated intensity B of a peak within a range of $2\theta=44.4\pm1°$ is 1.2 or more, (3) lithium carbonate included the positive electrode active material for lithium secondary batteries with respect to a total mass of the positive electrode active material for lithium secondary batteries is 0.7 mass % or less and lithium hydroxide included the positive electrode active material for lithium secondary batteries with respect to a total mass of the positive electrode active material for lithium secondary batteries is 0.7 mass % or less, and (4) a moisture content of the positive electrode active material for lithium secondary batteries with respect to a total mass of the positive electrode active material for lithium secondary batteries is 1000 ppm or less.

[2] The positive electrode active material for lithium secondary batteries according to [1], in which x in Composition Formula (A) is $0 < x < 0.1$.

[3] The positive electrode active material for lithium secondary batteries according to [1] or [2], in which a BET specific surface area of the positive electrode active material for lithium secondary batteries is 0.1 m$^2$/g or more and 2 m$^2$/g or less.

[4] The positive electrode active material for lithium secondary batteries according to any one of [1] to [3], in which, in a 10% cumulative particle diameter (D10), a 50% cumulative particle diameter (D50), and a 90% cumulative particle diameter (D90) obtained from values of a particle size distribution measurement of the positive electrode active material for lithium secondary batteries, the 50% cumulative particle diameter (D50) is 5 μm or more and 20 μm or less, and Equation (B) shown below is satisfied, $$0.8 \leq (D_{90}-D_{10})/D_{50} \leq 1.5 \qquad (B).$$

[5] The positive electrode active material for lithium secondary batteries according to any one of [1] to [4], in which a tap density of the positive electrode active material for lithium secondary batteries is 1.5 g/cc or more and 3.5 g/cc or less.

[6] The positive electrode active material for lithium secondary batteries according to any one of [1] to [5], further including at least one of a covering particle and a covering layer formed of lithium containing metal composite oxide containing Li and X (X is one or more element selected from the group consisting of B, Al, Ti, Zr, La, and W) on a surface of the primary particle or secondary particle of the lithium composite metal compound.

[7] The positive electrode active material for lithium secondary batteries according to any one of [1] to [5], further including a covering particle or a covering layer formed of lithium containing metal composite oxide containing Li and X (X is one or more element selected from the group consisting of B, Al, Ti, Zr, La, and W) on a surface of the primary particle or secondary particle of the lithium composite metal compound.

[8] The positive electrode active material for lithium secondary batteries according to [6] or [7], in which a proportion ($\{X/(Ni+Co+Mn+M)\}\times100$) which is an atomic ratio of X in the covering particle or the covering layer with respect to a sum of the atomic ratio of Ni, Co, Mn, and M in the positive electrode active material for lithium secondary batteries is 0.05 mol % or more and 5 mol % or less.

[9] The positive electrode active material for lithium secondary batteries according to any one of [6] to [8], wherein the covering particle or the covering layer includes $LiAlO_2$.

[10] The positive electrode active material for lithium secondary batteries according to any one of [6] to [9], wherein the covering particle or the covering layer includes at least one of $Li_2WO_4$ and $Li_3WO_5$.

[11] A positive electrode for lithium secondary batteries including the positive electrode active material for lithium secondary batteries according to any one of [1] to [10].

[12] A lithium secondary batteries including the positive electrode for lithium secondary batteries according to [11].

Advantageous Effects of Invention

According to the present invention, it is possible to provide a positive electrode active material for lithium secondary batteries with high cycle characteristics under high voltage and a positive electrode for lithium secondary batteries and a lithium secondary battery using the same.

DESCRIPTION OF EMBODIMENTS

<Positive Electrode Active Material for Lithium Secondary Batteries>

A positive electrode active material for lithium secondary batteries according to the present invention includes a lithium composite metal compound containing secondary particles that are aggregates of primary particles which are capable of being doped or dedoped with lithium ions and satisfies all of the following requirements (1) to (4). Hereinafter, each of the requirements (1) to (4) will be described.

Requirement (1)

A lithium composite metal compound included in the positive electrode active material for lithium secondary batteries of the present embodiment includes a crystal structure of $\alpha$-$NaFeO_2$ type represented by the following Composition Formula (A).

$$Li[Li_x(Ni_aCo_bMn_cM_d)_{1-x}]O_2 \quad (A)$$

(in Composition Formula (A), $-0.1 \leq x \leq 0.2$, $0.7 \leq a < 1$, $0 < b \leq 0.3$, $0 \leq c \leq 0.2$, $0 \leq d \leq 0.1$ and $a+b+c+d=1$ are satisfied, and M represents one or more elements selected from the group consisting of Mg, Ca, Sr, Ba, Zn, B, Al, Ga, Ti, Zr, Ge, Fe, Cu, Cr, V, W, Mo, Sc, Y, La, Nb, Ta, Tc, Ru, Rh, Pd, Ag, Cd, In, and Sn)

In the positive electrode active material for lithium secondary batteries, from the viewpoint of obtaining a lithium secondary battery having high cycle characteristics under high voltage, x in Composition Formula (A) is preferably more than 0, more preferably 0.01 or more, and even more preferably 0.02 or more.

In addition, from the viewpoint of obtaining a lithium secondary battery having higher initial Columbic efficiency, x in Composition Formula (A) is preferably 0.18 or less, more preferably 0.15 or less, and even more preferably 0.1 or less.

The upper limit and the lower limit of x can be arbitrarily combined. For example, x is preferably $0<x<0.1$, more preferably $0.01<x<0.1$, and even more preferably $0.02<x<0.1$.

In the present specification, "cycle characteristics is high" means that the discharge capacity retention ratio is high.

In addition, from the viewpoint of obtaining a lithium secondary battery having a high capacity, a in Composition Formula (A) is preferably more than 0.70, more preferably 0.72 or more, and more preferably 0.75 or more. In addition, from the viewpoint of obtaining a lithium secondary battery having high discharging capacity at a high current rate, a in Composition Formula (A) is preferably 0.92 or less, more preferably 0.91 or less, and even more preferably 0.9 or less.

The upper limit and the lower limit of a can be arbitrarily combined. For example, a is preferably more than 0.70 and 0.92 or less, more preferably 0.72 or more and 0.91 or less, and even more preferably 0.75 or more and 0.9 or less.

Further, from the viewpoint of obtaining a lithium secondary battery having high cycle characteristics under high voltage, b in Composition Formula (A) is preferably 0.07 or more, more preferably 0.1 or more, and even more preferably 0.13 or more. Furthermore, from the viewpoint of obtaining a lithium secondary battery having a high thermal stability, b in Composition Formula (A) is preferably 0.25 or less, more preferably 0.23 or less, and even more preferably 0.20 or less.

The upper limit and the lower limit of b can be arbitrarily combined. For example, b is preferably 0.07 or more and 0.25 or less, more preferably 0.1 or more and 0.23 or less, and even more preferably 0.13 or more and 0.20 or less.

In addition, from the viewpoint of obtaining a lithium secondary battery having high cycle characteristics under high voltage, c in Composition Formula (A) is preferably 0.01 or more, more preferably 0.02 or more, and even more preferably 0.03 or more. Furthermore, from the viewpoint of obtaining a lithium secondary battery having high storage characteristics at high temperatures (for example, in an environment at 60° C.), c in Composition Formula (A) is preferably 0.18 or less, more preferably 0.15 or less, and even more preferably 0.10 or less.

The upper limit and the lower limit of c can be arbitrarily combined. For example, c is preferably 0.01 or more and 0.18 or less, more preferably 0.02 or more and 0.15 or less, and even more preferably 0.03 or more and 0.10 or less.

M in Composition Formula (A) represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

M is a metal arbitrarily included in the lithium composite metal compound when desired. M may not be necessarily included in the lithium composite metal compound.

From the viewpoint of improving a handleability of a positive electrode active material for lithium secondary batteries having high cycle characteristics, d in Composition Formula (A) is preferably more than 0, more preferably 0.001 or more, and more preferably 0.003 or more. In addition, from the viewpoint of obtaining a lithium secondary battery having high discharging capacity at a high current rate, d in Composition Formula (A) is preferably 0.08 or less, more preferably 0.07 or less, and even more preferably 0.06 or less.

The upper limit and the lower limit of d can be arbitrarily combined. For example, d is preferably more than 0 and 0.08 or less, more preferably 0.001 or more and 0.07 or less, and even more preferably 0.003 or more and 0.06 or less.

Furthermore, M in Composition Formula (A) is preferably one of Al, Zr, W, Mo and Nb from the viewpoint of obtaining a lithium secondary battery having high cycle characteristics under a high voltage, and is preferably one of Mg, Al, Zr, and W from the viewpoint of obtaining a lithium secondary battery having high thermal stability.

In the present specification, "primary particles which are capable of being doped or dedoped with a lithium ion" means primary particles formed of a lithium composite metal compound represented by the Compositional Formula (A).

Requirement (2)

When the positive electrode active material for lithium secondary batteries of the present embodiment is measured in powder X-ray diffraction measurement using CuKα radiation, a ratio A/B of an integrated intensity A of a peak within a range of $2\theta=18.7\pm1°$ and an integrated intensity B of a peak within a range of $2\theta=44.4\pm1°$ is 1.2 or more.

The integrated intensity A and the integrated intensity B of the positive electrode active material for lithium secondary batteries of the present embodiment can be confirmed as follows.

First, a diffraction peak within a range of $2\theta=18.7\pm1°$ (which may be referred to as a peak A', hereinafter) of the positive electrode active material for lithium secondary batteries is determined in powder X-ray diffraction measurement using CuKα radiation. A diffraction peak within a range of $2\theta=44.4\pm1°$ (which may be referred to as a peak B', hereinafter) is determined.

Next, an integrated intensity A of the determined peak A' and an integrated intensity B of the determined peak B' are calculated, and the ratio A/B of the integrated intensity A and the integrated intensity B is calculated.

In the present embodiment, A/B is preferably 1.21 or more, and more preferably 1.22 or more.

In addition, A/B is preferably 1.5 or less, more preferably 1.45 or less, and even more preferably 1.4 or less.

The upper limit and the lower limit can be arbitrarily combined. For example, A/B is preferably 1.21 or more and 1.5 or less, more preferably 1.22 or more and 1.45 or less.

The positive electrode active material for lithium secondary batteries with A/B in the above-described range has a strong crystal structure and can be superior in cycle characteristics under high voltage.

Requirement (3)

According to the positive electrode active material for lithium secondary batteries of the present embodiment, lithium carbonate included the positive electrode active material for lithium secondary batteries with respect to the total mass of the positive electrode active material for lithium secondary batteries is 0.7 mass % or less and lithium hydroxide included the positive electrode active material for lithium secondary batteries with respect to the total mass of the positive electrode active material for lithium secondary batteries is 0.7 mass % or less From the view point of improving a handleability of the positive electrode active material for lithium secondary batteries, the lithium carbonate included in the positive electrode active material for lithium secondary batteries with respect to the total mass of the positive electrode active material for lithium secondary batteries is preferably 0.65 mass % or less, more preferably 0.5 mass % or less, and even more preferably 0.4 mass % or less.

As an aspect of the present invention, the lithium carbonate included in the positive electrode active material for lithium secondary batteries with respect to the total mass of the positive electrode active material for lithium secondary batteries is preferably 0 mass % or more and 0.65 mass % or less, more preferably 0.001 mass % or more and 0.5 mass % or less, and even more preferably 0.01 mass % or more and 0.4 mass % or less.

In addition, from the view point of improving a handleability of the positive electrode active material for lithium secondary batteries, the lithium hydroxide included in the positive electrode active material for lithium secondary batteries is preferably 0.65 mass % or less, more preferably 0.6 mass % or less, and even more preferably 0.5 mass % or less.

As another aspect of the present invention, the lithium hydroxide included in the positive electrode active material for lithium secondary batteries with respect to the total mass of the positive electrode active material for lithium secondary batteries is preferably 0 mass % or more and 0.65 mass % or less, more preferably 0.001 mass % or more and 0.6 mass % or less, and even more preferably 0.01 mass % or more and 0.5 mass % or less.

When the amounts of both the lithium carbonate and the lithium carbonate are in the above-described ranges, generation of gas inside the battery during charging and discharging can be suppressed and the lithium secondary battery with high cycle characteristics under high voltage can be obtained.

The amounts of the lithium carbonate and the lithium hydroxide included in the positive electrode active material for lithium secondary batteries can be obtained by a neutralization titration using acid solution. Specifically, the positive electrode active material for lithium secondary batteries is contact-treated with pure water in order to elute the lithium carbonate and the lithium hydroxide in the pure water. The amounts of the lithium carbonate and lithium hydroxide can be obtained by a neutralization titration of the eluted solution using acid solution. More specific operations and a calculation method of the amounts of the lithium carbonate and lithium hydroxide will be explained in Examples.

Requirement (4)

In the positive electrode active material for lithium secondary batteries of the present embodiment, a moisture content included in the positive electrode active material for lithium secondary batteries with respect to the total mass of the positive electrode active material for lithium secondary batteries is 1000 ppm or less, preferably 800 ppm or less, more preferably 600 ppm or less, and even more preferably 550 ppm or less.

The less moisture content included in the positive electrode active material for lithium secondary batteries is more preferable, however, the practical lower limit value is about 50 ppm with respect to the total mass of the positive electrode active material for lithium secondary batteries.

When the moisture content is in the range of the above-described range, a generation of gas inside the battery during charging and discharging can be suppressed and the lithium secondary battery with high cycle characteristics under high voltage can be obtained.

The moisture content included in the positive electrode active material for lithium secondary batteries is defined as a value of a moisture content of 1 g of the powder of the positive electrode active material for lithium secondary batteries measured using a coulometric Karl Fischer moisture meter (831 Coulometer, manufactured by Metrohm AG).

(BET Specific Surface Area)

In the present embodiment, from the viewpoint of obtaining a positive electrode active material for lithium secondary batteries having a high discharge capacity at a high current rate, the BET specific surface area ($m^2/g$) of the positive electrode active material for lithium secondary batteries is preferably 0.1 $m^2/g$ or more, preferably 0.15 $m^2/g$ or more, and even more preferably 0.20 $m^2/g$ or more. In addition, from the viewpoint of reducing the hygroscopicity of the positive electrode active material for lithium secondary batteries, the BET specific surface area ($m^2/g$) of the positive electrode active material is preferably 2.0 $m^2/g$ or less, and more preferably 1.8 $m^2/g$ or less, and even more preferably 1.5 $m^2/g$ or less.

The upper limit and the lower limit of the BET specific surface area ($m^2/g$) of the positive electrode active material for lithium secondary batteries can be arbitrarily combined. For example, the BET specific surface area ($m^2/g$) of the positive electrode active material for lithium secondary batteries is preferably 0.1 $m^2/g$ or more and 2.0 $m^2/g$ or less, more preferably 0.15 $m^2/g$ or more and 1.8 $m^2/g$ or less, and even more preferably 0.20 $m^2/g$ or more and 1.5 $m^2/g$ or less.

The BET specific surface area ($m^2/g$) of the present embodiment can be measured by using a BET specific surface area measuring device (Macsorb (registered trademark) manufactured by MOUNTECH Co., Ltd.) after drying 1 g of the powder of the positive electrode active material for lithium secondary batteries in a nitrogen atmosphere at 105° C. for 30 minutes.

(Layered Structure)

The crystal structure of the positive electrode active material for lithium secondary batteries is a layered structure, and more preferably a hexagonal crystal structure or a monoclinic crystal structure.

The hexagonal crystal structure belongs to any one space group selected from the group consisting of P3, $P3_1$, $P3_2$, R3, P-3, R-3, P312, P321, $P3_112$, $P3_121$, $P3_212$, $P3_221$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3$/m, P622, $P6_122$, $P6_522$, $P6_222$, $P6_422$, $P6_322$, P6 mm, P6cc, $P6_3$ cm, $P6_3$mc, P-6m2, P-6c2, P-62m, P-62c, P6/mmm, P6/mcc, $P6_3$/mcm, and $P6_3$/mmc.

In addition, the monoclinic crystal structure belongs to any one space group selected from the group consisting of P2, $P2_1$, C2, Pm, Pc, Cm, Cc, P2/m, $P2_1$/m, C2/m, P2/c, $P2_1$/c, and C2/c.

Among these, from the viewpoint of obtaining a positive electrode active material for lithium secondary batteries having a high discharge capacity, the crystal structure is particularly preferably a hexagonal crystal structure belonging to the space group R-3m, or a monoclinic crystal structure belonging to C2/m.

(Particle Size Distribution)

In the present embodiment, from the viewpoint of obtaining a positive electrode active material for lithium secondary batteries having a high discharge capacity at a high current rate, in a 10% cumulative particle diameter $D_{10}$ (μm), a 50% cumulative particle diameter $D_{50}$ (μm), and a 90% cumulative particle diameter $D_{90}$ (μm) obtained from values of a particle size distribution measurement of the positive electrode active material for lithium secondary batteries, the 50% cumulative particle diameter $D_{50}$ (μm) is preferably 5 μm or more and 20 μm or less. Additionally, $D_{10}$, $D_{50}$, and $D_{90}$ preferably satisfy the following Equation (B).

$$0.8 \leq (D_{90} - D_{10})/D_{50} \leq 1.5 \tag{B}$$

From the view point of obtaining the positive electrode active material for lithium secondary batteries having a high thermal stability, the 50% cumulative particle diameter $D_{50}$ (μm) of the positive electrode active material for lithium secondary batteries is more preferably 6 μm or more, and even more preferably 7 μm or more. From the view point of obtaining the positive electrode active material for lithium secondary batteries having a high discharge capacity at a high current rate, the 50% cumulative particle diameter $D_{50}$ (μm) of the positive electrode active material for lithium secondary batteries is more preferably 18 μm or less, and even more preferably 16 μm or less.

The upper limit and the lower limit can be arbitrarily combined. For example, the 50% cumulative particle diameter $D_{50}$ (μm) of the positive electrode active material for lithium secondary batteries is more preferably 6 μm or more and 18 μm or less, and even more preferably 7 μm or more and 16 μm or less.

From the view point of obtaining the positive electrode active material for lithium secondary batteries having a high energy density, the 10% cumulative particle diameter $D_{10}$ (μm) of the positive electrode active material for lithium secondary batteries is more preferably 1 μm or more, and even more preferably 2 μm or more. From the viewpoint of obtaining a positive electrode active material for lithium secondary batteries having a high discharge capacity at a high current rate, the 10% cumulative particle diameter $D_{10}$ (μm) of the positive electrode active material for lithium secondary batteries is more preferably 15 μm or less, and even more preferably 12 μm or less.

From the view point of obtaining the positive electrode active material for lithium secondary batteries having a high energy density, the 90% cumulative particle diameter $D_{90}$ (μm) of the positive electrode active material for lithium secondary batteries is more preferably 20 μm or more, and even more preferably 25 μm or more. From the viewpoint of obtaining a positive electrode active material for lithium secondary batteries having a high discharge capacity at a high current rate, the 90% cumulative particle diameter $D_{90}$ (μm) of the positive electrode active material for lithium secondary batteries is more preferably 40 μm or less, and even more preferably 35 μm or less.

The 10% cumulative particle diameter $D_{10}$ (μm), 50% cumulative particle diameter $D_{50}$ (μm), and 90% cumulative particle diameter $D_{90}$ (μm) can be measured by using a laser diffraction particle size distribution analyzer. Specifically, using a laser diffraction scattering particle size distribution analyzer (LA-950 manufactured by HORIBA, Ltd.), 0.1 g of the positive electrode active material for lithium secondary batteries is poured into 50 ml of 0.2 mass % sodium hexametaphosphate aqueous solution, whereby a dispersion liquid in which the positive electrode active material for lithium secondary batteries is dispersed is obtained. The particle size distribution of the obtained dispersion liquid is measured to obtain a volume-based cumulative particle size distribution curve. In the obtained cumulative particle size distribution curve, the value of the particle diameter ($D_{50}$) viewed from the fine particle side at a 50% cumulative point is taken as the average secondary particle diameter of the positive electrode active material for lithium secondary batteries. Similarly, the value of the particle diameter ($D_{10}$) viewed from the fine particle side at a 10% cumulative point is taken as a 10% cumulative diameter, and the value of the particle diameter ($D_{90}$) viewed from the fine particle side at a 90% cumulative point is taken as a 90% cumulative diameter.

(Tap Density)

From the view point of obtaining the positive electrode active material for lithium secondary batteries having a high energy density, a tap density of the positive electrode active material for lithium secondary batteries of the present embodiment is preferably 1.5 g/cc or more, more preferably 1.6 g/cc or more, and even more preferably 1.7 g/cc or more. Additionally, from the viewpoint of obtaining a positive electrode active material for lithium secondary batteries having a high discharge capacity at a high current rate, the tap density of the positive electrode active material for lithium secondary batteries is preferably 3.5 g/cc or less, more preferably 3.4 g/cc or less, and even more preferably 3.3 g/cc or less.

The upper limit and the lower limit can be arbitrarily combined. For example, the tap density of the positive electrode active material for lithium secondary batteries is preferably 1.5 g/cc or more and 3.5 g/cc or less, more preferably 1.6 g/cc or more and 3.4 g/cc or less, and even more preferably 1.7 g/cc or more and 3.3 g/cc or less.

Here, the tap density corresponds to a tap bulk density according to JIS R 1628-1997. Specifically, the positive electrode active material for lithium secondary batteries which is a measurement sample is fallen and filled in 20 cm³ of a measurement container through a sieve, and the container is filled with the measurement sample. A lid is put on the container. The volume of the sample after repeating tapping 200 times with a stroke length of 50 mm is read and calculated.

From the view point of obtaining the positive electrode active material for lithium secondary batteries having a high thermal stability, the positive electrode active material for lithium secondary batteries of the present embodiment preferably includes at least one of a covering particle and a covering layer formed of lithium containing metal composite oxide containing Li and X (X is one or more element selected from the group consisting of B, Al, Ti, Zr, La, and W) on the surface of the primary particle or secondary particle of the lithium composite metal compound and more preferably includes the covering particle or the covering layer.

(Covering Particle or Covering Layer)

The covering particle or covering layer includes the lithium containing metal composite oxide containing Li and X. X is one or more element selected from the group consisting of B, Al, Ti, Zr, La, and W, and is preferably Al or W.

The covering particle means a particle which is adhered on the surface of the primary particle or secondary particle of the lithium composite metal compound. Additionally, the covering layer means a layer covering at least a portion of the surface of the primary particle or secondary particle of the lithium composite metal compound. The covering layer does not necessarily uniformly cover the surface of the primary particle or secondary particle of the lithium composite metal compound. The covering layer may be missing in a portion, and the surface of the primary particle or secondary particle of the lithium composite metal compound may be exposed.

The covering particle or covering layer is preferably $LiAlO_2$ when Al is selected as X.

The covering particle or covering layer is preferably one or more of $Li_2WO_4$ and $Li_4WO_5$ when W is selected as X.

From the view point of the effect of the present invention, that is, improving cycle characteristics under high voltage, a ratio of $\{X/(Ni+Co+Mn+M)\} \times 100$ which is an atomic ratio of X in the covering particle or the covering layer with respect to a sum of the atomic ratio of Ni, Co, Mn, and M in the positive electrode active material for lithium secondary batteries is preferably 0.05 mol % or more and 5 mol % or less. The upper limit of $\{X/(Ni+Co+Mn+M)\} \times 100$ is more preferably 4 mol % and even more preferably 3 mol %. The lower limit of $\{X/(Ni+Co+Mn+M)\} \times 100$ is more preferably 0.1 mol % and even more preferably 1 mol %. The upper limit and the lower limit can be arbitrarily combined. For example, $\{X/(Ni+Co+Mn+M)\} \times 100$ is more preferably 0.1 mol % or more and 4 mol % or less, and even more preferably 1 mol % or more and 3 mol % or less.

In the present embodiment, the composition of the covering layer can be confirmed by using a STEM-EDX element line analysis of a cross section of the secondary particle, an induction coupling plasma emission analysis, an electron beam micro-analyzer analysis or the like. The crystal structure of the covering layer can be confirmed by a powder x-ray diffraction, an electron beam diffraction or the like.

[Method for Forming Positive Electrode Active Material for Lithium Secondary Batteries]

When forming of the positive electrode active material for lithium secondary batteries of the present invention, it is preferable that a metal composite compound containing metals other than lithium, that is, essential metals which are Ni, Co, and Mn and an optional metal including one or more of Mg, Ca, Sr, Ba, Zn, B, Al, Ga, Ti, Zr, Ge, Fe, Cu, Cr, V, W, Mo, Sc, Y, La, Nb, Ta, Tc, Ru, Rh, Pd, Ag, Cd, In, and Sn is first prepared, and the metal composite compound is calcined with an appropriate lithium salt. The optional metal is a metal optionally contained in the metal composite compound as desired, and the optional metal may not be contained in the metal composite compound in some cases. As the metal composite compound, a metal composite hydroxide or a metal composite oxide is preferable. Hereinafter, an example of a forming method of a positive electrode active material will be described by separately describing a step of forming the metal composite compound and a step of forming the lithium metal composite oxide.

(Step of Forming Metal Composite Compound)

The metal composite compound can be formed by a generally known batch coprecipitation method or continuous coprecipitation method. Hereinafter, the forming method will be described in detail, taking a metal composite hydroxide containing nickel, cobalt, and manganese as metals as an example.

First, by a coprecipitation method, particularly a continuous method described in Japanese Unexamined Patent Application, First Publication No. 2002-201028, a nickel salt solution, a cobalt salt solution, a manganese salt solution, and a complexing agent are reacted, whereby a metal composite hydroxide expressed by $Ni_aCo_bMn_c(OH)_2$ (in the formula, $0.7 \leq a < 1$, $0 < b \leq 0.3$, $0 \leq c \leq 0.2$) is formed.

A nickel salt which is a solute of the nickel salt solution is not particularly limited, and for example, any of nickel sulfate, nickel nitrate, nickel chloride, and nickel acetate can be used. As a cobalt salt which is a solute of the cobalt salt solution, for example, any of cobalt sulfate, cobalt nitrate, cobalt chloride, and cobalt acetate can be used. As a manganese salt which is a solute of the manganese salt solution, for example, any of manganese sulfate, manganese nitrate, manganese chloride, and manganese acetate can be used. The above metal salts are used at a ratio corresponding to the composition ratio of the $Ni_aCo_bMn_c(OH)_2$. That is, the amount of each of the metal salts is defined so that the molar ratio of nickel, cobalt, and manganese in the mixed solution containing the above metal salts becomes a:b:c. Also, water is used as a solvent.

The complexing agent is capable of forming a complex with ions of nickel, cobalt, and manganese in an aqueous solution, and examples thereof include ammonium ion donors (ammonium hydroxide, ammonium sulfate, ammonium chloride, ammonium carbonate, ammonium fluoride, and the like), hydrazine, ethylenediaminetetraacetic acid, nitrilotriacetic acid, uracildiacetic acid, and glycine. The complexing agent may not be contained, and in a case where the complexing agent is contained, the amount of the complexing agent contained in the mixed solution containing the nickel salt solution, the cobalt salt solution, the manganese salt solution, and the complexing agent is, for example, more than 0 and 2.0 or less in terms of molar ratio to the sum of the number of moles of the metal salts.

During the precipitation, an alkali metal hydroxide (for example, sodium hydroxide or potassium hydroxide) is added, if necessary, in order to adjust the pH value of the aqueous solution.

When the complexing agent in addition to the nickel salt solution, the cobalt salt solution, and the manganese salt solution is continuously supplied to a reaction tank, nickel, cobalt, and manganese react, whereby $Ni_aCo_bMn_c(OH)_2$ is formed. During the reaction, the temperature of the reaction tank is controlled to be, for example, 20° C. or more and 80° C. or less, and preferably in a range of 30° C. to 70° C., and the pH value in the reaction tank (when measured at 40° C.) is controlled to be, for example, a pH of 9 or more and a pH of 13 or less, and preferably in a range of a pH of 11 to 13 such that the materials in the reaction tank are appropriately stirred. The reaction tank is of a type which allows the formed reaction precipitate to overflow for separation.

In the present specification, a value of pH is a value measured at 40° C. Therefore, if a value of pH measured at different temperature is not in the range described in the present specification but a value of pH measured at 40° C. is in the range described in the present specification, the value of pH is understood as a value of pH in the range of the present invention.

By appropriately controlling the concentrations of the metal salts supplied to the reaction tank, the stirring speed, the reaction temperature, the reaction pH, calcining conditions, which will be described later, and the like, it is possible to control the above-described requirements (1) to (4) and various physical property such as a BET specific surface area of the positive electrode active material for lithium secondary batteries, which is finally obtained in the following steps.

Since the reaction conditions depend on the size of the reaction tank used and the like, the reaction conditions may be optimized while monitoring various physical properties of the lithium composite oxide, which is finally obtained.

After the above reaction, the obtained reaction precipitate is washed with water and then dried to isolate a nickel cobalt manganese hydroxide as a nickel cobalt manganese composite compound. In addition, the reaction precipitate obtained may be washed with a weak acid water or an alkaline solution containing sodium hydroxide or potassium hydroxide, as necessary.

In the above example, the nickel cobalt manganese composite hydroxide is formed, but a nickel cobalt manganese composite oxide may be prepared. In a case of preparing the nickel cobalt manganese composite oxide, for example, a step of bringing the coprecipitate slurry into contact with an oxidizing agent or a step of performing a heat treatment on the nickel cobalt manganese composite hydroxide may be performed.

(Step of Forming Lithium Metal Composite Oxide)

The metal composite oxide or hydroxide is dried and thereafter mixed with a lithium salt. The drying condition is not particularly limited, and for example, may be any of a condition under which a metal composite oxide or hydroxide is not oxidized and reduced (an oxide remains as an oxide and a hydroxide remains as a hydroxide), a condition under which a metal composite hydroxide is oxidized (a hydroxide is oxidized to an oxide), and a condition under which a metal composite oxide is reduced (an oxide is reduced to a hydroxide). In order to adopt the condition under which no oxidation and reduction occurs, an inert gas such as nitrogen, helium, or argon may be used, and to adopt the condition under which a hydroxide is oxidized, oxygen or air may be used. In addition, as a condition under which a metal composite oxide is reduced, a reducing agent such as hydrazine or sodium sulfite may be used in an inert gas atmosphere. As the lithium salt, any one or two or more of lithium carbonate, lithium nitrate, lithium acetate, lithium hydroxide, lithium hydroxide hydrate, and lithium oxide can be mixed and used.

After drying the metal composite oxide or hydroxide, classification may be appropriate performed thereon. The lithium salt and the metal composite hydroxide mentioned above are used in consideration of the composition ratio of the final object in order to satisfy the requirements (1) and (3). For example, in a case of using a nickel cobalt manganese composite hydroxide, the amounts of the lithium compound and the metal composite hydroxide are determined to be proportions corresponding to the composition ratio of $LiNi_aCo_bMn_cO_2$ (a+b+c=1 in the formula). By calcining a mixture of the nickel cobalt manganese metal composite hydroxide and the lithium salt, a lithium-nickel cobalt manganese composite oxide is obtained. For the calcining, dry air, oxygen atmosphere, inert atmosphere, and the like are used depending on the desired composition, and a plurality of heating steps are performed as necessary.

The calcining temperature of the metal composite oxide or hydroxide and the lithium salt such as lithium hydroxide or lithium carbonate is not particularly limited, but is preferably 600° C. or higher and 1000° C. or lower, more preferably 680° C. or higher and 950° C. or lower, and even more preferably 700° C. or higher and 900° C. or lower in order to satisfy the requirements (3) and (4) while the requirement (2) is in a specific range of the present invention.

When the calcining temperature is equal to or more than the above-described lower limit value, the positive electrode active material for lithium secondary batteries having a rigid crystal structure can be obtained. Also, when the calcining temperature is equal to or lower than the above-described upper limit value, volatilization of lithium can be reduced.

The calcining time is preferably 3 hours to 50 hours in total until retention of a target temperature is ended after the target temperature is reached. When the calcining time is more than 50 hours, the cell performance tends to be substantially inferior due to the volatilization of lithium although the problem does not occur in the cell performance. In other words, when the calcining time is 50 hours or less, the volatilization of lithium is not likely to occur, and the cell performance tends not to deteriorate. When the calcining time is shorter than 3 hours, the crystals develop poorly, and the cell performance tends to be deteriorated. In other words, when the calcining time is 3 hours or more, the crystals favorably develop, and the cell performance tends to be good. In addition, it is also effective to perform preliminary calcining before the above-mentioned calcining. The requirement (3) tends to be in the specific range of the present invention by performing the preliminary calcining. It is preferable to perform such a preliminary calcining at a temperature in a range of 300° C. to 850° C. for 1 to 10 hours.

It is preferable that the time until the calcining temperature is reached after the start of temperature increase is 0.5 hour or longer and 20 hours or shorter. When the time from the start of temperature increase until the calcining temperature is reached is in this range, more uniform lithium metal composite oxide can be obtained. Additionally, it is preferable that the time until the retaining of the calcining temperature is finished after the temperature is reached to the calcining temperature is 0.5 hour or longer and 20 hours or shorter. When the time until the retaining of the calcining temperature is finished after the temperature is reached to the calcining temperature is reached is in this range, the growth of crystals favorably proceeds, and the cell performance can be further improved.

The lithium metal composite oxide obtained by the calcining is suitably classified after pulverization and is regarded as a positive electrode active material applicable to a lithium secondary cell. When the pulverization and classifying step is performed in an atmosphere in which moisturize is removed, the requirement (4) can be easily in the specific range of the present invention. The pulverization of the lithium composite metal compound is preferably performed at a strength in which the aggregation of the secondary particles is pulverized but the secondary particles themselves are not pulverized.

[Method for Forming Positive Electrode Active Material for Lithium Secondary Batteries Including Covering Particles or Covering Layer]

When the positive electrode active material for lithium secondary batteries including the covering particles or the covering layer, the covering particles or the covering layer made of the lithium containing metal composite oxide can be formed on a surface of the primary particles or secondary particles of the lithium composite metal compound by mixing a raw material of covering material and the lithium composite metal compound and performing a heat treatment as necessary.

The positive electrode active material for lithium secondary batteries including the covering particles or covering layer obtained as described above is preferable since the requirements (3) and (4) is easily in the specific ranges of the present invention.

The raw material of the covering material may be oxide, hydroxide, carbonate salt, nitrate salt, sulfonate salt, halide, oxalic acid salt, or alchoxide including one or more element selected from the group consisting of B, Al, Ti, Zr, La, and W, and oxide is preferable.

In order to effectively cover the surface of the lithium composite metal compound by the raw material of the covering material, the raw material of the covering material is smaller particles than the secondary particles of the lithium composite metal compound. Specifically, the average diameter of the secondary particles of the raw material of the covering material is preferably 1 μm or less and more preferably 0.1 μm or less. The lower limit of the average diameter of the secondary particles is not particularly limited, however, is practically about 10 nm. The average diameter of the secondary particles can be measured by the same measurement method of the 50% cumulative diameter size $D_{50}$ of the secondary particles of the lithium composite metal compound.

The raw material of the covering material and the lithium composite metal compound may be mixed in the similar manner as mixing in forming the positive electrode active material for lithium secondary batteries. A method of mixing using a mixer which is not equipped with a mixing media such as a ball and in which a strong pulverization is not performed is preferable such as a method for mixing using a powder mixer equipped with a stirring blade therein. Also, the covering layer can firmly adhere to the surface of the lithium composite metal compound by holding it in an atmosphere including water after mixing.

The heating conditions (temperature and retention time) of a heat treatment performed as necessary after mixing the raw material of the covering material and the lithium composite metal compound may differ depending on a kind of the raw material of the covering material. The temperature of the heat treatment is preferably set in the range of 300 to 850° C. and is preferably equal to or lower than the calcining temperature of the lithium composite metal compound. When the temperature is higher than the calcining temperature of the lithium composite metal compound, the raw material of the covering material forms a solid solution with the lithium composite metal compound, and the covering layer may not be formed. The retention time of the heat treatment is preferably set to be shorter than the retention time of calcining. As an atmosphere of the heat treatment, the same atmosphere gases as those of the calcining are raised.

The positive electrode active material for lithium secondary batteries can be also obtained by forming the covering layer on the surface of the lithium composite metal compound by using a method such as sputtering, CVD, and a vapor deposition.

Also, the positive electrode active material for lithium secondary batteries may be obtained by mixing the metal composite oxide or hydroxide, the lithium salt, and the raw material of the covering material and calcining it.

The positive electrode active material for lithium secondary batteries including the covering particles or covering layer on the surface of the primary particles or secondary particles of the lithium composite metal compound is suitably pulverized and classified and becomes the positive electrode active material for lithium secondary batteries.

When the atmosphere of the pulverization and classification steps is an atmosphere in which moisture is removed, the requirement (4) can be easily set to be in the specific range of the present invention.

<Lithium Secondary Battery>

Next, a positive electrode using the positive electrode active material for lithium secondary batteries of one aspect of the present invention as a positive electrode active material of a lithium secondary battery, and a lithium secondary battery having the positive electrode will be described while describing the configuration of a lithium secondary battery.

An example of the lithium secondary battery of the present embodiment includes a positive electrode, a negative electrode, a separator interposed between the positive electrode and the negative electrode, and an electrolytic solution disposed between the positive electrode and the negative electrode.

Figure 1A:
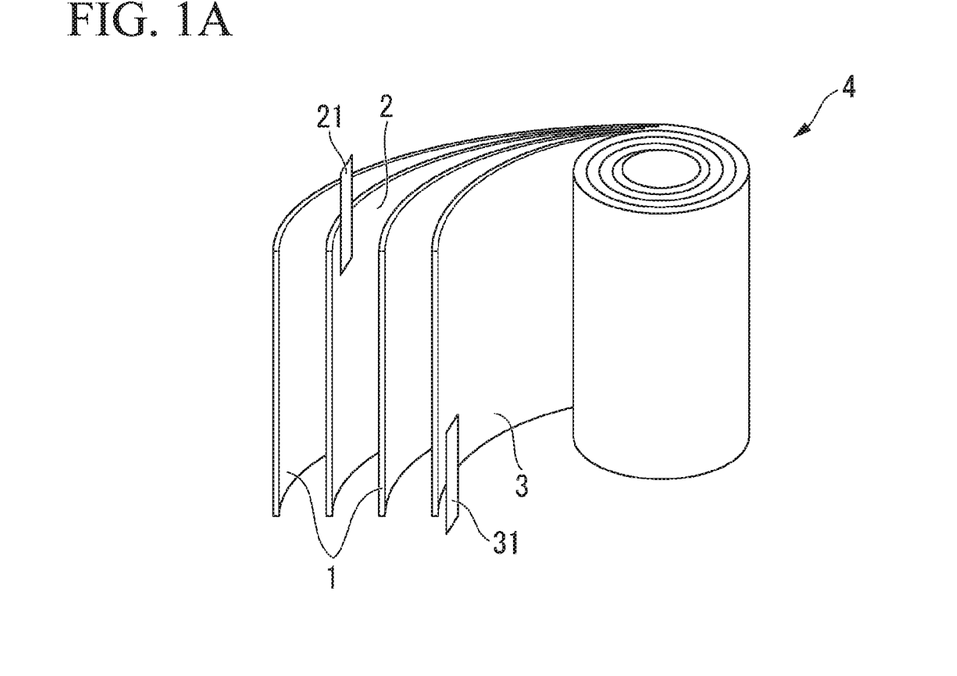
FIG. 1A is a schematic configuration view illustrating an example of a lithium-ion secondary battery.
Figure 1B:
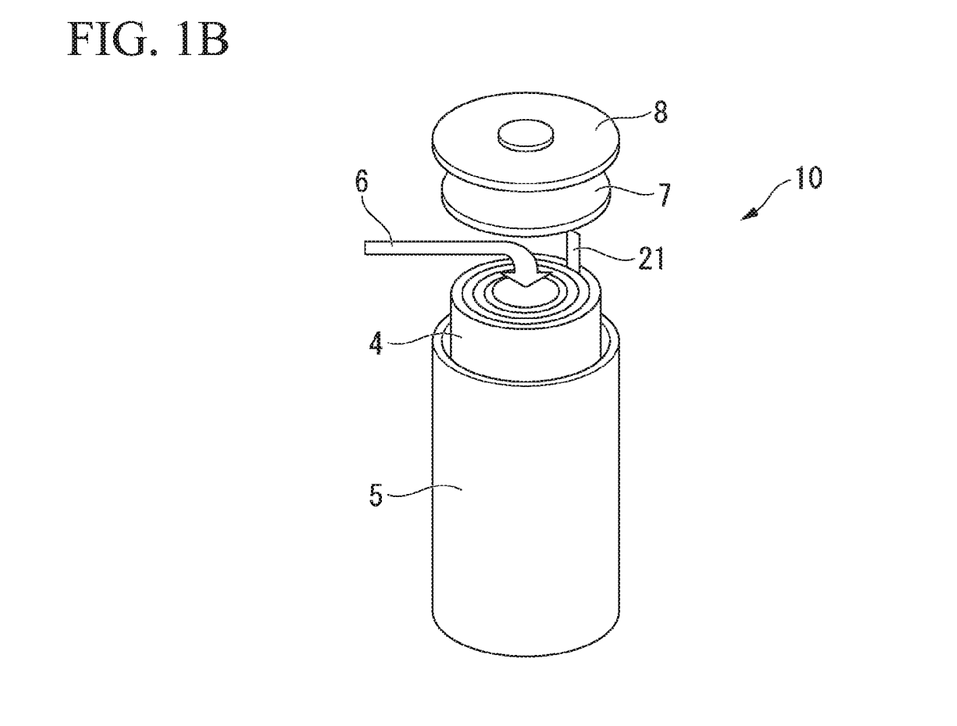
FIG. 1B is a schematic configuration view illustrating an example of the lithium-ion secondary battery.

FIGS. 1A and 1B are schematic views illustrating an example of the lithium secondary battery of the present embodiment. A cylindrical lithium secondary battery 10 of the present embodiment is manufactured as follows.

First, as illustrated in FIG. 1A, a pair of separators 1 having a strip shape, a strip-shaped positive electrode 2 having a positive electrode lead 21 at one end, and a strip-like negative electrode 3 having a negative electrode lead 31 at one end are stacked in order of the separator 1, the positive electrode 2, the separator 1, and the negative electrode 3 and are wound to form an electrode group 4.

Next, as shown in FIG. 1B, the electrode group 4 and an insulator (not shown) are accommodated in a battery can 5, the can bottom is then sealed, the electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be manufactured.

The shape of the electrode group 4 is, for example, a columnar shape such that the cross-sectional shape when the electrode group 4 is cut in a direction perpendicular to the winding axis is a circle, an ellipse, a rectangle, or a rectangle with rounded corners.

In addition, as a shape of the lithium secondary battery having the electrode group 4, a shape defined by IEC60086, which is a standard for a battery defined by the International Electrotechnical Commission (IEC), or by JIS C 8500 can be adopted. For example, shapes such as a cylindrical shape and a square shape can be adopted.

Furthermore, the lithium secondary battery is not limited to the wound type configuration, and may have a stacked type configuration in which a stacked structure of a positive electrode, a separator, a negative electrode, and a separator is repeatedly stacked. The stacked type lithium secondary battery can be exemplified by a so-called coin type battery, a button-type battery, and a paper type (or sheet type) battery.

Hereinafter, each configuration will be described in order.

(Positive Electrode)

The positive electrode of the present embodiment can be manufactured by first adjusting a positive electrode mixture containing a positive electrode active material, a conductive material, and a binder, and causing a positive electrode current collector to support the positive electrode mixture.

(Conductive Material)

A carbon material can be used as the conductive material of the positive electrode of the present embodiment. As the carbon material, graphite powder, carbon black (for example, acetylene black), a fibrous carbon material, and the like, can be used. Since carbon black is fine particles and has a large surface area, the addition of a small amount of carbon black to the positive electrode mixture increases the conductivity inside the positive electrode and thus improves the charge and discharge efficiency and output characteristics. However, when too much carbon black is added, both the binding force between the positive electrode mixture and the positive electrode current collector and the binding force inside the positive electrode mixture by the binder decrease, which causes an increase in internal resistance.

The proportion of the conductive material in the positive electrode mixture is preferably 5 parts by mass or more and 20 parts by mass or less with respect to 100 parts by mass of the positive electrode active material. In a case of using a fibrous carbon material such as graphitized carbon fiber or carbon nanotube as the conductive material, it is possible to lower this ratio.

(Binder)

A thermoplastic resin can be used as the binder included in the positive electrode of the present embodiment.

As the thermoplastic resin, fluorine resins such as polyvinylidene fluoride (hereinafter, sometimes referred to as PVdF), polytetrafluoroethylene (hereinafter, sometimes referred to as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene can be adopted.

These thermoplastic resins may be used as a mixture of two or more. By using a fluorine resin and a polyolefin resin as the binder and setting the ratio of the fluorine resin to the total mass of the positive electrode mixture to 1 mass % or more and 10 mass % or less and the ratio of the fluorine resin to 0.1 mass % or more and 2 mass % or less, a positive electrode mixture having high adhesion to the current collector and high bonding strength in the positive electrode mixture can be obtained.

(Positive Electrode Current Collector)

As the positive electrode current collector included in the positive electrode of the present embodiment, a strip-shaped member formed of a metal material such as Al, Ni, or stainless steel as the forming material can be used. Among these, from the viewpoint of ease of processing and low cost, it is preferable to use Al as the forming material and process Al into a thin film.

As a method of causing the positive electrode current collector to support the positive electrode mixture, a method of press-forming the positive electrode mixture on the positive electrode current collector can be adopted. In addition, the positive electrode mixture may be held by the positive electrode current collector by forming the positive electrode mixture into a paste using an organic solvent, applying the paste of the positive electrode mixture on at least one side of the positive electrode current collector, drying the paste, and pressing the paste to be fixed.

In a case of forming the positive electrode mixture into a paste, as the organic solvent which can be used, amine solvents such as N,N-dimethylaminopropylamine and diethylenetriamine; ether solvents such as tetrahydrofuran; ketone solvents such as methyl ethyl ketone; ester solvents such as methyl acetate; and amide solvents such as dimethylacetamide and N-methyl-2-pyrrolidone (hereinafter, sometimes referred to as NMP) can be adopted.

Examples of a method of applying the paste of the positive electrode mixture to the positive electrode current collector include a slit die coating method, a screen coating method, a curtain coating method, a knife coating method, a gravure coating method, and an electrostatic spraying method.

The positive electrode can be manufactured by the method mentioned above.

(Negative Electrode)

The negative electrode included in the lithium secondary battery of the present embodiment may be capable of being doped or dedoped with lithium ions at a potential lower than that of the positive electrode, and an electrode in which a negative electrode mixture containing a negative electrode active material is held by a negative electrode current collector, and an electrode formed of a negative electrode active material alone can be adopted.

(Negative Electrode Active Material)

As the negative electrode active material included in the negative electrode, materials can be doped or dedoped with lithium ions at a potential lower than that of the positive electrode, such as carbon materials, chalcogen compounds (oxides, sulfides, and the like), nitrides, metals, and alloys can be adopted.

As the carbon materials that can be used as the negative electrode active material, graphite such as natural graphite and artificial graphite, cokes, carbon black, pyrolytic carbons, carbon fibers, and an organic polymer compound baked body can be adopted.

As the oxides that can be used as the negative electrode active material, oxides of silicon expressed by the formula $SiO_x$ (where, x is a positive real number) such as $SiO_2$ and $SiO$; oxides of titanium expressed by the formula $TiO_x$ (where x is a positive real number) such as $TiO_2$ and $TiO$; oxides of vanadium expressed by the formula $VO_x$ (where x is a positive real number) such as $V_2O_5$ and $VO_2$; oxides of iron expressed by the formula $FeO_x$ (where x is a positive real number) such as $Fe_3O_4$, $Fe_2O_3$, and $FeO$; oxides of tin expressed by the formula $SnO_x$ (where x is a positive real number) such as $SnO_2$ and $SnO$; oxides of tungsten expressed by a general formula $WO_x$ (where, x is a positive real number) such as $WO_3$ and $WO_2$; complex metal oxides containing lithium and titanium or vanadium such as $Li_4Ti_5O_{12}$ and $LiVO_2$ can be adopted.

As the sulfides that can be used as the negative electrode active material, sulfides of titanium expressed by the formula $TiS_x$ (where, x is a positive real number) such as $Ti_2S_3$, $TiS_2$, and $TiS$; sulfides of vanadium expressed by the formula $VS_x$ (where x is a positive real number) such $V_3S_4$, $VS_2$, and $VS$; sulfides of iron expressed by the formula $FeS_x$ (where x is a positive real number) such as $Fe_3S_4$, $FeS_2$, and $FeS$; sulfides of molybdenum expressed by the formula $MoS_x$ (where x is a positive real number) such as $Mo_2S_3$ and $MoS_2$; sulfides of tin expressed by the formula $SnS_x$ (where x is a positive real number) such as $SnS_2$ and $SnS$; sulfides of tungsten expressed by $WS_x$ (where x is a positive real number) such as $WS_2$; sulfides of antimony expressed by the formula $SbS_x$ (where x is a positive real number) such as $Sb_2S_3$; sulfides of selenium expressed by the formula $SeS_x$ (where x is a positive real number) such as $Se_5S_3$, $SeS_2$, and $SeS$ can be adopted.

As the nitrides that can be used as the negative electrode active material, lithium-containing nitrides such as $Li_3N$ and $Li_{3-x}A_xN$ (where A is either one or both of Ni and Co, and $0<x<3$ is satisfied) can be adopted.

These carbon materials, oxides, sulfides, and nitrides may be used singly or in combination of two or more. In addition, these carbon materials, oxides, sulfides, and nitrides may be either crystalline or amorphous.

Moreover, as the metals that can be used as the negative electrode active material, lithium metal, silicon metal, tin metal, and the like can be adopted.

As the alloys that can be used as the negative electrode active material, lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; alloys such as $Cu_2Sb$ and $La_3Ni_2Sn_7$ can be adopted.

These metals and alloys are mainly used alone as an electrode after being processed into, for example, a foil shape.

Among the above-mentioned negative electrode active materials, the carbon material mainly including graphite such as natural graphite and artificial graphite is preferably used because the potential of the negative electrode hardly changes from the uncharged state to the fully charged state during charging (the potential flatness is good), the average discharge potential is low, and the capacity retention ratio during repeated charging and discharging is high (the cycle characteristics are good). The shape of the carbon material may be, for example, a flaky shape such as natural graphite, a spherical shape such as mesocarbon microbeads, a fibrous shape such as graphitized carbon fiber, or an aggregate of fine powder.

The negative electrode mixture described above may contain a binder as necessary. As the binder, a thermoplastic resin can be adopted, and specifically, PVdF, thermoplastic polyimide, carboxymethylcellulose, polyethylene, and polypropylene can be adopted.

(Negative Current Collector)

As the negative electrode collector included in the negative electrode, a strip-shaped member formed of a metal material, such as Cu, Ni, and stainless steel, as the forming material can be adopted. Among these, it is preferable to use Cu as the forming material and process Cu into a thin film because Cu is less likely to form an alloy with lithium and can be easily processed.

As a method of causing the negative electrode current collector to support the negative electrode mixture, similarly to the case of the positive electrode, a method using press-forming, or a method of forming the negative electrode mixture into a paste using a solvent or the like, applying the paste onto the negative electrode current collector, drying the paste, and pressing the paste to be compressed can be adopted.

(Separator)

As the separator included in the lithium secondary battery of the present embodiment, for example, a material having a form such as a porous film, non-woven fabric, or woven fabric made of a material such as a polyolefin resin such as polyethylene and polypropylene, a fluorine resin, and a nitrogen-containing aromatic polymer. In addition, two or more of these materials may be used to form the separator, or these materials may be stacked to form the separator.

In the present embodiment, the air resistance of the separator according to the Gurley method defined by JIS P 8117 is preferably 50 sec/100 cc or more and 300 sec/100 cc or less, and more preferably 50 sec/100 cc or more and 200 sec/100 cc or less in order for the electrolyte to favorably permeate therethrough during battery use (during charging and discharging).

In addition, the porosity of the separator is preferably 30 vol % or more and 80 vol % or less, and more preferably 40 vol % or more and 70 vol % or less with respect to the volume of the separator. The separator may be a laminate of separators having different porosity.

(Electrolytic Solution)

The electrolytic solution included in the lithium secondary battery of the present embodiment contains an electrolyte and an organic solvent.

As the electrolyte contained in the electrolytic solution, lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (here, BOB refers to bis(oxalato)borate), LiFSI (here, FSI refers to bis(fluorosulfonyl)imide), lower aliphatic carboxylic acid lithium salts, and $LiAlCl_4$ can be adopted, and a mixture of two or more of these may be used. Among these, as the electrolyte, it is preferable to use at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$, which contain fluorine.

As the organic solvent included in the electrolytic solution, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propanesultone, or those obtained by introducing a fluoro group into these organic solvents (those in which one or more of the hydrogen atoms of the organic solvent are substituted with a fluorine atom) can be used.

As the organic solvent, it is preferable to use a mixture of two or more kinds thereof. Among these, a mixed solvent containing a carbonate is preferable, and a mixed solvent of a cyclic carbonate and a non-cyclic carbonate and a mixed solvent of a cyclic carbonate and an ether are more preferable. As the mixed solvent of a cyclic carbonate and a non-cyclic carbonate, a mixed solvent containing ethylene carbonate, dimethyl carbonate, and ethyl methyl carbonate is preferable. An electrolytic solution using such a mixed solvent has many features such as a wide operating temperature range, being less likely to deteriorate even when charged and discharged at a high current rate, being less likely to deteriorate even during a long-term use, and being non-degradable even in a case where a graphite material such as natural graphite or artificial graphite is used as the negative electrode active material.

Furthermore, as the electrolytic solution, it is preferable to use an electrolytic solution containing a lithium salt containing fluorine such as $LiPF_6$ and an organic solvent having a fluorine substituent in order to enhance the safety of the obtained lithium secondary battery. A mixed solvent containing ethers having a fluorine substituent, such as pentafluoropropyl methyl ether and 2,2,3,3-tetrafluoropropyl difluoromethyl ether and dimethyl carbonate is even more preferable because the capacity retention ratio is high even when charging or discharging is performed at a high current rate.

A solid electrolyte may be used instead of the electrolytic solution. As the solid electrolyte, for example, an organic polymer electrolyte such as a polyethylene oxide-based polymer compound, or a polymer compound containing at least one or more of a polyorganosiloxane chain or a polyoxyalkylene chain can be used. A so-called gel type in which a non-aqueous electrolyte is held in a polymer compound can also be used. Inorganic solid electrolytes containing sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ can be adopted, and a mixture or two or more kinds thereof may be used. By using these solid electrolytes, the safety of the lithium secondary battery may be further enhanced.

In addition, in a case of using a solid electrolyte in the lithium secondary battery of the present embodiment, there may be cases where the solid electrolyte plays a role of the separator, and in such a case, the separator may not be required.

Since the positive electrode active material having the above-described configuration uses the lithium containing composite metal oxide of the present embodiment described above, the cycle characteristics under high voltage of the lithium secondary battery using the positive electrode active material can be extended.

Moreover, since the positive electrode having the above-described configuration has the positive electrode active material for lithium secondary batteries of the present embodiment described above, the cycle characteristics under high voltage of the lithium secondary battery can be extended.

Furthermore, since the lithium secondary battery having the above-described configuration has the positive electrode described above, a lithium secondary battery having a superior cycle characteristics under high voltage than in the related art can be achieved.

EXAMPLES

Next, an embodiment of the present invention will be described in more detail with reference to examples.

In the present examples, evaluation of the positive electrode active material for lithium secondary batteries was performed as follows.

[Compositional Analysis]

The compositional analysis of the lithium composite metal compound formed by the method described below was performed by using an inductively coupled plasma emission analyzer (SPS 3000, manufactured by SII Nano Technology Inc.) after dissolving the obtained powder of the lithium composite metal compound in hydrochloric acid.

[Measurement of Integrated Intensity Ratio of Positive Electrode Active Material for Lithium Secondary Batteries]

Powder X-ray diffraction measurement of the positive electrode active material for lithium secondary batteries was performed using an X-ray diffractometer (X'Prt PRO manufactured by Malvern Panalytical Ltd). The obtained positive electrode active material for lithium secondary batteries was provided in a dedicated substrate, and measurement was performed using a Cu-Kα radiation source at a diffraction angle in a range of 2θ=10° to 90° to obtain a powder X-ray diffraction pattern. Using powder X-ray diffraction pattern comprehensive analysis software JADE 5, an integrated intensity A corresponding a peak A' and an integrated intensity B corresponding a peak B' were obtained from the powder X-ray diffraction pattern, and a ratio of the integrated intensity A and the integrated intensity B (A/B) was calculated.

$2θ=18.7±1°$          Peak A':

$2θ=44.6±1°$          Peak B':

[Determination of Residual Lithium Included in Positive Electrode Active Material for Lithium Secondary Batteries]

20 g of a positive electrode active material for lithium secondary batteries and 100 g of pure water were added to a 100 ml beaker and stirred for five minutes. After stirring, the positive electrode active material for lithium secondary batteries was filtrated. 0.1 mol/L of hydrochloric acid was dropped into 60 g of the filtrate, and pH of the filtrate was measured by a pH meter. As A ml is provided as a titration amount of the hydrochloric acid at pH=8.3±0.1, and B ml is provided as a titration amount of the hydrochloric acid at pH=4.5±0.1, concentrations of residual lithium carbonate and lithium hydroxide in the positive electrode active material for lithium secondary batteries were calculated according to the following equation. In the following equation, molecular weight of the lithium carbonate and lithium hydroxide was calculated by assuming that each atomic weight were H; 1.000, Li: 6.941, C; 12, and 0; 16.

$$\text{Concentration of lithium carbonate (\%)} = 0.1 \times (B-A)/1000 \times 73.882/(20 \times 60/100) \times 100$$

$$\text{Concentration of lithium hydroxide (\%)} = 0.1 \times (2A-B)/1000 \times 23.941/(20 \times 60/100) \times 100$$

[Measurement of Moisture Content]

The moisture content of a cathode active material was measured using a coulometric Karl Fischer moisture meter (831 Coulometer, manufactured by Metrohm AG) with respect to 1 g of a powder of a positive electrode active material for lithium secondary batteries to be measured.

[Measurement of BET Specific Surface Area]

After 1 g of a powder of the positive electrode active material for lithium secondary batteries was dried in a nitrogen atmosphere at 105° C. for 30 minutes, the powder was measured using a BET specific surface area meter device (Macsorb (registered trademark) manufactured by MOUNTECH Co., Ltd.).

[Measurement of Average Particle Diameter]

Using a laser diffraction particle size distribution analyzer (LA-950 manufactured by HORIBA, Ltd.), 0.1 g of a powder of a lithium metal composite oxide was poured into 50 ml of 0.2 mass % sodium hexametaphosphate aqueous solution, whereby a dispersion liquid in which the powder was dispersed was obtained. The particle size distribution of the obtained dispersion liquid was measured to obtain a volume-based cumulative particle size distribution curve. In the obtained cumulative particle size distribution curve, the value of the cumulative particle diameter ($D_{50}$) viewed from the fine particle side at a 50% cumulative point was taken as the average secondary particle diameter. Also, the value of the cumulative particle diameter ($D_{10}$) viewed from the fine particle side at a 10% cumulative point was taken as a 10% cumulative diameter, and the value of the cumulative particle diameter ($D_{90}$) viewed from the fine particle side at a 90% cumulative point was similarly taken as a 90% cumulative diameter.

[Measurement of Tap Density]

The tap density was obtained in accordance with a method described in JIS R 1628-1997.

The positive electrode active material for lithium secondary batteries which was a measurement sample was fallen and filled in 20 cm³ of a measurement container through a sieve, and the container was filled with the measurement sample. A lid was put on the container. The volume of the sample after tapping 200 times with a stroke length of 50 mm was read and calculated.

[Production of Lithium Secondary Battery]

Production of Positive Electrode for Lithium Secondary Batteries

A paste-like positive electrode mixture was prepared by adding the positive electrode active material for lithium secondary batteries obtained by the forming method described later, a conductive material (acetylene black), and a binder (PVdF) to achieve a composition of positive electrode active material for lithium secondary batteries: conductive material:binder=92:5:3 (mass ratio) and performing kneading thereon. During the preparation of the positive electrode mixture, N-methyl-2-pyrrolidone was used as an organic solvent.

The obtained positive electrode mixture was applied to a 40 μm-thick Al foil serving as a current collector and vacuum dried at 150° C. for 8 hours to obtain a positive electrode for lithium secondary batteries. The electrode area of the positive electrode for lithium secondary batteries was set to 1.65 cm².

Production of Lithium Secondary Battery (Coin Type Cell)

The following operation was performed in a glove box under a dry air atmosphere.

The positive electrode produced in "Production of Positive Electrode for Lithium Secondary Batteries" was placed on the lower lid of a part for coin type battery R2032 (manufactured by Hohsen Corp.) with the aluminum foil surface facing downward, and a laminated film separator (a heat-resistant porous layer (thickness 16 μm) laminated on a polyethylene porous film) was placed thereon. 300 μl of electrolytic solution was injected thereinto. The electrolytic solution used here was prepared by dissolving $LiPF_6$ in a mixed solution of ethylene carbonate, dimethyl carbonate, and ethyl methyl carbonate whose ratio is 30:35:35 (volume ratio) so that $LiPF_6$ be 1.0 mol/L.

Next, metal lithium was used as a negative electrode. The negative electrode was placed on the upper side of the laminated film separator, covered with the upper lid via a gasket, and caulked by a caulking machine, whereby a lithium secondary battery (coin type cell R2032, hereinafter, sometimes referred to as "coin type cell") was produced.

Charge and Discharge Test

<Cycle Test>

Using the coin type cell manufactured in "Production of Lithium Secondary Battery (Coin Type Cell)", a cycle test for 50 cycles under the following conditions was conducted to perform the life time evaluation, and a discharge capacity retention ratio after 50 cycles was calculated by using the following equation. It is indicated that the higher the discharge capacity retention ratio after 50 cycles is the better the cycle characteristics under high voltage is.

$$\text{Discharge capacity retention ratio after 50 cycles (\%)} = \text{Discharge capacity at 50th cycle/Discharge capacity at the first cycle} \times 100$$

Hereinafter, the discharge capacity retention ratio after 50 cycles may be recited as "cycle retention ratio".

[Cycle Test Conditions]

Test temperature: 25° C.

Charging condition: Maximum voltage at charging 4.45 V, Charging time 2.0 hours, Charging current 0.5 CA Pause time after charging: 10 minutes
Discharging condition: Minimum voltage at discharging 2.5 V, Discharging time 1.0 hour, Discharging current 1.0 CA
Pause time after discharging: 10 minutes
In this test, a process performing charging, pausing of charge, discharging, pausing of discharging in series was counted as one time.

Example 1

1. Production of Positive Electrode Active Material 1 for Lithium Secondary Batteries After water was added to a reaction tank equipped with a stirrer and an overflow pipe, an aqueous solution of sodium hydroxide was added thereto, and the liquid was maintained at a temperature of 60° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.875:0.095:0.02, whereby a mixed raw material solution was prepared.

Next, the mixed raw material solution, 10.8 mass % of an aqueous solution of aluminum sulfate, and an aqueous solution of ammonium sulfate (complexing agent) were continuously added into the reaction tank whilst stirring. The flow rate of the aqueous solution of aluminum sulfate was adjusted so that atomic ratio of nickel atom, cobalt atom, manganese atom, and aluminum atom became 0.875:0.095:0.02:0.01. An aqueous solution of sodium hydroxide was timely added dropwise so that the pH of the solution in the reaction tank became 11.8 (when measured at 40° C.) to obtain nickel cobalt manganese aluminum composite hydroxide particles, and the particles were washed with a sodium hydroxide solution, thereafter dehydrated by centrifugation to isolate, and dried at 105° C., whereby a nickel cobalt manganese aluminum composite hydroxide 1 was obtained.

The nickel cobalt manganese aluminum composite hydroxide 1 obtained as described above, lithium hydroxide, and tungsten oxide were weighed to achieve Li/(Ni+Co+Mn+Al)=1.05 (molar ratio) and W/(Ni+Co+Mn+Al)=0.004 (molar ratio) and mixed. Thereafter, the mixture was calcined in an oxygen atmosphere at 760° C. for 5 hours, whereby a lithium composite oxide 1 was obtained. Next, the lithium composite oxide 1 and aluminum oxide were weighed to achieve Al (aluminum contained in aluminum oxide)/(Ni+Co+Mn+Al (aluminum contained in the lithium composite oxide 1))=0.015 and mixed. Thereafter, the mixture was calcined in an oxygen atmosphere at 760° C. for 10 hours and pulverized in an atmosphere of −10° C. of a dew point, whereby a target positive electrode active material 1 for lithium secondary batteries was obtained.

2. Evaluation of Positive Electrode Active Material 1 for Lithium Secondary Batteries Requirement (1)

From STEM-EDX analysis of a cross section of a particle of the obtained positive electrode active material 1 for lithium secondary batteries, the formation of the covering layer was confirmed. Also, the covering layer included $LiAlO_2$, $Li_2WO_4$, and $Li_4WO_5$ and a proportion (X/(Ni+Co+Mn+Al)) of an atomic ratio of X in the covering layer with respect to the sum of atomic ratio of Ni, Co, Mn, and Al in the positive electrode active material for lithium secondary batteries was 0.019 according to an ICP composition analysis and a crystal structure analysis of the positive electrode active material 1 for lithium secondary batteries.

When the lithium composite metal compound included in the positive electrode active material 1 for lithium secondary batteries was applied to Composition Formula (A), x=0.01, a=0.875, b=0.095, c=0.02, and d=0.01 were confirmed.

Requirement (2)

Additionally, a ratio (A/B) of an integrated intensity A and an integrated intensity B was 1.23.

Requirement (3)

The amount of the lithium carbonate included in the positive electrode active material 1 for lithium secondary batteries was 0.53 mass % with respect to the total mass of the positive electrode active material 1 for lithium secondary batteries.

The amount of the lithium hydroxide included in the positive electrode active material 1 for lithium secondary batteries was 0.51 mass % with respect to the total mass of the positive electrode active material 1 for lithium secondary batteries.

Requirement (4)

The moisture content of the positive electrode active material 1 for lithium secondary batteries was 330 ppm with respect to the total mass of the positive electrode active material 1 for lithium secondary batteries.

The BET specific surface area of the positive electrode active material 1 for lithium secondary batteries was 0.26 m$^2$/g.

$D_{50}$ of the positive electrode active material 1 for lithium secondary batteries was 12.1 μm, and $(D_{90}-D_{10})/D_{50}$ was 1.05.

The tap density of the positive electrode active material 1 for lithium secondary batteries was 2.7 g/cc.

A coin type cell was formed using the positive electrode active material 1 for lithium secondary batteries, and the cycle test was performed. The discharging capacity retention ratio was 83.9%.

Example 2

1. Production of Positive Electrode Active Material 2 for Lithium Secondary Batteries The nickel cobalt manganese aluminum composite hydroxide 1 and a powder of lithium hydroxide were weighed to achieve Li/(Ni+Co+Mn+Al)=1.03 (molar ratio) and mixed. Thereafter, the mixture was calcined in an oxygen atmosphere at 760° C. for 5 hours, and further calcined in an oxygen atmosphere at 760° C. for 10 hours and pulverized in an atmosphere of −10° C. of a dew point, whereby a target positive electrode active material 2 for lithium secondary batteries was obtained.

2. Evaluation of Positive Electrode Active Material 2 for Lithium Secondary Batteries Requirement (1)

A composition analysis of the obtained positive electrode active material 2 for lithium secondary batteries was performed. When the lithium composite metal compound included in the positive electrode active material 2 for lithium secondary batteries was applied to Composition Formula (A), x=0.0, a=0.875, b=0.095, c=0.02, and d=0.01 were confirmed.

Requirement (2)

Additionally, a ratio (A/B) of an integrated intensity A and an integrated intensity B was 1.25.

Requirement (3)

The amount of the lithium carbonate included in the positive electrode active material 2 for lithium secondary batteries was 0.18 mass % with respect to the total mass of the positive electrode active material 2 for lithium secondary batteries.

The amount of the lithium hydroxide included in the positive electrode active material 2 for lithium secondary batteries was 0.39 mass % with respect to the total mass of the positive electrode active material 2 for lithium secondary batteries.

Requirement (4)

The moisture content of the positive electrode active material 2 for lithium secondary batteries was 290 ppm with respect to the total mass of the positive electrode active material 2 for lithium secondary batteries.

The BET specific surface area of the positive electrode active material 2 for lithium secondary batteries was 0.26 m$^2$/g.

$D_{50}$ of the positive electrode active material 2 for lithium secondary batteries was 11.3 μm, and $(D_{90}-D_{10})/D_{50}$ was 1.04.

The tap density of the positive electrode active material 2 for lithium secondary batteries was 2.6 g/cc.

A coin type cell was formed using the positive electrode active material 2 for lithium secondary batteries, and the cycle test was performed. The discharging capacity retention ratio was 84.3%.

Example 3

1. Production of Positive Electrode Active Material 3 for Lithium Secondary Batteries After water was added to a reaction tank equipped with a stirrer and an overflow pipe, an aqueous solution of sodium hydroxide was added thereto, and the liquid was maintained at a temperature of 45° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 0.71:0.19:0.10, whereby a mixed raw material solution was prepared.

Next, the mixed raw material solution and an aqueous solution of ammonium sulfate (complexing agent) were continuously added into the reaction tank whilst stirring. An aqueous solution of sodium hydroxide was timely added dropwise so that the pH of the solution in the reaction tank became 10.4 (when measured at 40° C.) to obtain nickel cobalt manganese composite hydroxide particles, and the particles were washed with a sodium hydroxide solution, thereafter dehydrated by centrifugation to isolate, and dried at 105° C., whereby a nickel cobalt manganese composite hydroxide 3 was obtained.

The nickel cobalt manganese composite hydroxide 3 obtained as described above and lithium hydroxide were weighed to achieve Li/(Ni+Co+Mn)=1.05 (molar ratio) and mixed. Thereafter, the mixture was calcined in an oxygen atmosphere at 850° C. for 10 hours. Thereafter, the mixture was further calcined in an oxygen atmosphere at 700° C. for 5 hours and pulverized in an atmosphere of −10° C. of a dew point, whereby a target positive electrode active material 3 for lithium secondary batteries was obtained.

2. Evaluation of Positive Electrode Active Material 3 for Lithium Secondary Batteries Requirement (1)

A composition analysis of the obtained positive electrode active material 3 for lithium secondary batteries was performed. When the lithium composite metal compound included in the positive electrode active material 3 for lithium secondary batteries was applied to Composition Formula (A), x=0.02, a=0.71, b=0.19, and c=0.10 were confirmed.

Requirement (2)

Additionally, a ratio (A/B) of an integrated intensity A and an integrated intensity B was 1.28.

Requirement (3)

The amount of the lithium carbonate included in the positive electrode active material 3 for lithium secondary batteries was 0.38 mass % with respect to the total mass of the positive electrode active material 3 for lithium secondary batteries.

The amount of the lithium hydroxide included in the positive electrode active material 3 for lithium secondary batteries was 0.33 mass % with respect to the total mass of the positive electrode active material 3 for lithium secondary batteries.

Requirement (4)

The moisture content of the positive electrode active material 3 for lithium secondary batteries was 510 ppm with respect to the total mass of the positive electrode active material 3 for lithium secondary batteries.

The BET specific surface area of the positive electrode active material 3 for lithium secondary batteries was 0.55 m$^2$/g.

$D_{50}$ of the positive electrode active material 3 for lithium secondary batteries was 8.7 μm, and $(D_{90}-D_{10})/D_{50}$ was 0.96.

The tap density of the positive electrode active material 3 for lithium secondary batteries was 2.1 g/cc.

A coin type cell was formed using the positive electrode active material 3 for lithium secondary batteries, and the cycle test was performed. The discharging capacity retention ratio was 88.2%.

Comparative Example 1

1. Production of Positive Electrode Active Material 4 for Lithium Secondary Batteries The nickel cobalt manganese aluminum composite hydroxide 1 and a powder of lithium hydroxide were weighed to achieve Li/(Ni+Co+Mn+Al)=1.00 (molar ratio) and mixed. Thereafter, the mixture was calcined in an oxygen atmosphere at 760° C. for 5 hours, whereby a lithium composite oxide 4 was obtained. Thereafter, the lithium composite oxide 4 and aluminum oxide were weighed to achieve Al (aluminum contained in aluminum oxide)/(Ni+Co+Mn+Al (aluminum contained in the lithium composite oxide 4))=0.015 (molar ratio) and mixed. Thereafter, the mixture was calcined in an oxygen atmosphere at 760° C. for 10 hours and pulverized in an atmosphere of −10° C. of a dew point, whereby a target positive electrode active material 4 for lithium secondary batteries was obtained.

2. Evaluation of Positive Electrode Active Material 4 for Lithium Secondary Batteries Requirement (1)

From STEM-EDX analysis of a cross section of a particle of the obtained positive electrode active material 4 for lithium secondary batteries, the formation of the covering layer was confirmed. Also, the covering layer included LiAlO$_2$ and a proportion (X/(Ni+Co+Mn+Al)) of an atomic ratio of X in the covering layer with respect to the sum of atomic ratio of Ni, Co, Mn, and Al in the positive electrode active material for lithium secondary batterieswas 0.015 according to an ICP composition analysis and a crystal structure analysis of the positive electrode active material 4.

When the lithium composite metal compound included in the positive electrode active material 4 for lithium secondary batteries was applied to Composition Formula (A), x=0.00, a=0.875, b=0.095, c=0.02, and d=0.01 were confirmed.

Requirement (2)

Additionally, a ratio (A/B) of an integrated intensity A and an integrated intensity B was 1.18.

Requirement (3)

The amount of the lithium carbonate included in the positive electrode active material 4 for lithium secondary batteries was 0.19 mass % with respect to the total mass of the positive electrode active material 4 for lithium secondary batteries.

The amount of the lithium hydroxide included in the positive electrode active material 4 for lithium secondary batteries was 0.25 mass % with respect to the total mass of the positive electrode active material 4 for lithium secondary batteries.

Requirement (4)

The moisture content of the positive electrode active material 4 for lithium secondary batteries was 280 ppm with respect to the total mass of the positive electrode active material 4 for lithium secondary batteries.

The BET specific surface area of the positive electrode active material 4 for lithium secondary batteries was 0.25 m$^2$/g.

$D_{50}$ of the positive electrode active material 4 for lithium secondary batteries was 11.7 μm, and $(D_{90}-D_{100})/D_{50}$ was 1.04.

The tap density of the positive electrode active material 4 for lithium secondary batteries was 2.4 g/cc.

A coin type cell was formed using the positive electrode active material 4 for lithium secondary batteries, and the cycle test was performed. The discharging capacity retention ratio was 74.9%.

Comparative Example 2

1. Production of Positive Electrode Active Material 5 for Lithium Secondary Batteries The nickel cobalt manganese aluminum composite hydroxide 1 and a powder of lithium hydroxide were weighed to achieve Li/(Ni+Co+Mn+Al)=1.10 (molar ratio) and mixed. Thereafter, the mixture was calcined in an oxygen atmosphere at 760° C. for 5 hours, and further calcined in an oxygen atmosphere at 760° C. for 10 hours and pulverized in an atmosphere of −10° C. of a dew point, whereby a target positive electrode active material 5 for lithium secondary batteries was obtained.

2. Evaluation of Positive Electrode Active Material 5 for Lithium Secondary Batteries Requirement (1)

A composition analysis of the obtained positive electrode active material 5 for lithium secondary batteries was performed. When the lithium composite metal compound included in the positive electrode active material 5 for lithium secondary batteries was applied to Composition Formula (A), x=0.04, a=0.875, b=0.095, c=0.02, and d=0.01 were confirmed.

Requirement (2)

Additionally, a ratio (A/B) of an integrated intensity A and an integrated intensity B was 1.25.

Requirement (3)

The amount of the lithium carbonate included in the positive electrode active material 5 for lithium secondary batteries was 1.11 mass % with respect to the total mass of the positive electrode active material 5 for lithium secondary batteries.

The amount of the lithium hydroxide included in the positive electrode active material 5 for lithium secondary batteries was 0.44 mass % with respect to the total mass of the positive electrode active material 5 for lithium secondary batteries.

Requirement (4)

The moisture content of the positive electrode active material 5 for lithium secondary batteries was 540 ppm with respect to the total mass of the positive electrode active material 5 for lithium secondary batteries.

The BET specific surface area of the positive electrode active material 5 for lithium secondary batteries was 0.38 m$^2$/g.

$D_{50}$ of the positive electrode active material 5 for lithium secondary batteries was 14.4 μm, and $(D_{90}-D_{10})/D_{50}$ was 1.27.

The tap density of the positive electrode active material 5 for lithium secondary batteries was 2.2 g/cc.

A coin type cell was formed using the positive electrode active material 5 for lithium secondary batteries, and the cycle test was performed. The discharging capacity retention ratio was 59.4%.

Comparative Example 3

1. Production of Positive Electrode Active Material 6 for Lithium Secondary Batteries The nickel cobalt manganese aluminum composite hydroxide 1 and a powder of lithium hydroxide were weighed to achieve Li/(Ni+Co+Mn+Al)=1.04 (molar ratio) and mixed. Thereafter, the mixture was calcined in an oxygen atmosphere at 760° C. for 5 hours, whereby a lithium composite oxide 6 was obtained. Thereafter, the lithium composite oxide 6 and aluminum oxide were weighed to achieve Al (aluminum contained in aluminum oxide)/(Ni+Co+Mn+Al (aluminum contained in the lithium composite oxide 6))=0.015 (molar ratio) and mixed. Thereafter, the mixture was calcined in an oxygen atmosphere at 760° C. for 10 hours and pulverized in an air atmosphere, whereby a target positive electrode active material 6 for lithium secondary batteries was obtained.

2. Evaluation of Positive Electrode Active Material 6 for Lithium Secondary Batteries Requirement (1)

From STEM-EDX analysis of a cross section of a particle of the obtained positive electrode active material 6 for lithium secondary batteries, the formation of the covering layer was confirmed. Also, the covering layer included LiAlO$_2$ and a proportion (X/(Ni+Co+Mn+Al)) of an atomic ratio of X in the covering layer with respect to the sum of atomic ratio of Ni, Co, Mn, and Al in the positive electrode active material for lithium secondary batteries was 0.015 according to an ICP composition analysis and a crystal structure analysis the positive electrode active material 6 for lithium secondary batteries.

When the lithium composite metal compound included in the positive electrode active material 6 for lithium secondary batteries was applied to Composition Formula (A), x=0.02, a=0.875, b=0.095, c=0.02, and d=0.01 were confirmed.

Requirement (2)

Additionally, a ratio (A/B) of an integrated intensity A and an integrated intensity B was 1.21.

Requirement (3)

The amount of the lithium carbonate included in the positive electrode active material 6 for lithium secondary batteries was 0.22 mass % with respect to the total mass of the positive electrode active material 6 for lithium secondary batteries.

The amount of the lithium hydroxide included in the positive electrode active material 6 for lithium secondary batteries was 0.63 mass % with respect to the total mass of the positive electrode active material 6 for lithium secondary batteries.

Requirement (4)

The moisture content of the positive electrode active material 6 for lithium secondary batteries was 1222 ppm with respect to the total mass of the positive electrode active material 6 for lithium secondary batteries.

The BET specific surface area of the positive electrode active material 6 for lithium secondary batteries was 0.22 m$^2$/g.

$D_{50}$ of the positive electrode active material 6 for lithium secondary batteries was 11.2 µm, and $(D_{90}-D_{10})/D_{50}$ was 0.96.

The tap density of the positive electrode active material 6 for lithium secondary batteries was 2.4 g/cc.

A coin type cell was formed using the positive electrode active material 6 for lithium secondary batteries, and the cycle test was performed. The discharging capacity retention ratio was 75.3%.

The compositions and the like of the positive electrode active materials for lithium secondary batteries are shown together in the following Tables 1 to 3. In Table 1, Ni/Me indicates a proportion of nickel atoms (mol %) with respect to the sum of nickel atoms, cobalt atoms, manganese atoms, and aluminum atoms included in the composite metal compound. Co/Me indicates a proportion of cobalt atoms (mol %) with respect to the sum of nickel atoms, cobalt atoms, manganese atoms, and aluminum atoms included in the composite metal compound. Mn/Me indicates a proportion of manganese atoms (mol %) with respect to the sum of nickel atoms, cobalt atoms, manganese atoms, and aluminum atoms included in the composite metal compound. Al/Me indicates a proportion of aluminum atoms (mol %) with respect to the sum of nickel atoms, cobalt atoms, manganese atoms, and aluminum atoms included in the composite metal compound.

In Table 3, X/(Ni+Co+Mn+M) indicates a value shown in mol % which is a proportion of an atomic ratio of X in the covering layer.

TABLE 1

|  | Ni/Me mol % | Co/Me mol % | Mn/Me mol % | Al/Me mol % | Integrated intensity A/B — |
|---|---|---|---|---|---|
| Example 1 | 87.5 | 9.5 | 2.0 | 1.0 | 1.23 |
| Example 2 | 87.5 | 9.5 | 2.0 | 1.0 | 1.25 |
| Example 3 | 71.0 | 19.0 | 10.0 | 0.0 | 1.28 |
| Comparative Example 1 | 87.5 | 9.5 | 2.0 | 1.0 | 1.18 |
| Comparative Example 2 | 87.5 | 9.5 | 2.0 | 1.0 | 1.25 |
| Comparative Example 3 | 87.5 | 9.5 | 2.0 | 1.0 | 1.21 |

TABLE 2

|  | Residual Li Li$_2$CO$_3$ (mass %) | Residual Li LiOH (mass %) | Moisture content (ppm) | X in Compositional Formula (A) | BET specific surface area (m$^2$/g) |
|---|---|---|---|---|---|
| Example 1 | 0.53 | 0.51 | 330 | 0.01 | 0.26 |
| Example 2 | 0.18 | 0.39 | 290 | 0 | 0.26 |
| Example 3 | 0.38 | 0.33 | 510 | 0.02 | 0.55 |
| Comparative Example 1 | 0.19 | 0.25 | 280 | 0 | 0.25 |
| Comparative Example 2 | 1.11 | 0.44 | 540 | 0.04 | 0.38 |
| Comparative Example 3 | 0.22 | 0.63 | 1222 | 0.02 | 0.22 |

TABLE 3

|  | $D_{50}$ (µm) | $(D_{90} - D_{10})/D_{50}$ | Tap density (g/cc) | Covering particles or Covering layer | X/(Ni + Co + Mn + M) (mol %) | Covering particles or Covering layer | Cycle characteristic (4.45 V 50 cyc.) (%) |
|---|---|---|---|---|---|---|---|
| Example 1 | 12.1 | 1.05 | 2.7 | Present | 1.9 | LiAlO$_2$, Li$_2$WO$_4$, Li$_4$WO$_5$ | 83.9 |
| Example 2 | 11.3 | 1.04 | 2.6 | Absent | 0 | — | 84.3 |
| Example 3 | 8.7 | 0.96 | 2.1 | Absent | 0 | — | 88.2 |
| Comparative Example 1 | 11.7 | 1.04 | 2.4 | Present | 1.5 | LiAlO$_2$ | 74.9 |
| Comparative Example 2 | 14.4 | 1.27 | 2.2 | Absent | 0 | — | 59.4 |
| Comparative Example 3 | 11.2 | 0.96 | 2.4 | Present | 1.5 | LiAlO$_2$ | 75.3 |

As the above-described results, the cycle characteristics under high voltage were high, specifically 80% or more, in Examples 1 to 3 to which the present invention was applied. On the other hand, the cycle characteristics under high voltage were quite lower than 80% in Comparative Examples 1 to 3 to which the present invention was not applied.

INDUSTRIAL APPLICABILITY

According to the present invention, it is possible to provide a positive electrode active material for lithium secondary batteries in which a cycle characteristics under

The invention claimed is:

1. A positive electrode active material for lithium secondary batteries including a lithium composite metal compound containing secondary particles that are aggregates of primary particles which are capable of being doped or dedoped with lithium ions, the positive electrode active material for lithium secondary batteries satisfying all of the following requirements (1) to (4), (1) the lithium composite metal compound has a crystal structure of α-NaFeO$_2$ type which is represented by Composition Formula (A) described below, $$\text{Li}[\text{Li}_x(\text{Ni}_a\text{Co}_b\text{Mn}_c\text{M}_d)_{1-x}]\text{O}_2 \qquad (A)$$

where: $-0.1 \leq x \leq 0.2$, $0.7 \leq a < 1$, $0 < b \leq 0.3$, $0 \leq c \leq 0.2$, $0 \leq d \leq 0.1$ and $a+b+c+d=1$ are satisfied, and M represents one or more elements selected from the group consisting of Mg, Ca, Sr, Ba, Zn, B, Al, Ga, Ti, Zr, Ge, Fe, Cu, Cr, V, W, Mo, Sc, Y, La, Nb, Ta, Tc, Ru, Rh, Pd, Ag, Cd, In, and Sn), (2) when the positive electrode active material for lithium secondary batteries is measured in powder X-ray diffraction measurement using CuKα radiation, a ratio A/B of an integrated intensity A of a peak within a range of 2θ=18.7±1° and an integrated intensity B of a peak within a range of 2θ=44.4±1° is 1.2 or more, (3) lithium carbonate is included the positive electrode active material for lithium secondary batteries at 0.7 mass % or less with respect to a total mass of the positive electrode active material for lithium secondary batteries, and lithium hydroxide is included in the positive electrode active material for lithium secondary batteriesat 0.7 mass % ot less with respect to the total mass of the positive electrode active material for lithium secondary batteries, and (4) a moisture content of the positive electrode active material for lithium secondary batteries is 1000 ppm or less with respect to the total mass of the positive electrode active material for lithium secondary batteries;

a tap density of the positive electrode active material for lithium secondary batteries is 1.5 g/cc or more and 3.5 g/cc or less, and at least one of a covering particle and a covering layer consists of a lithium containing metal composite oxide, where the lithium containing metal composite oxide consists of Li, X, and O, where X is one or more element selected from the group consisting of B, Al, Ti, Zr, La, and W, on a surface of the primary particle or secondary particle of the lithium composite metal compound.

2. The positive electrode active material for lithium secondary batteries according to claim 1, wherein the covering particle or the covering layer is at least one of LiAlO$_2$.

3. The positive electrode active material for lithium secondary batteries according to claim 1, wherein the covering particle or the covering layer is at least one of Li$_2$WO$_4$ and Li$_4$WO$_5$.

4. The positive electrode active material for lithium secondary batteries according to claim 1, wherein the covering layer is a lithium containing metal composite oxide consisting of Li, W, and O.

5. The positive electrode active material for lithium secondary batteries according to claim 1, wherein a BET specific surface area of the positive electrode active material for lithium secondary batteries is 0.1 m$^2$/g or more and 2 m$^2$/g or less.

6. The positive electrode active material for lithium secondary batteries according to claim 1, wherein in a 10% cumulative particle diameter (D$_{10}$), a 50% cumulative particle diameter (D$_{50}$), and a 90% cumulative particle diameter (D$_{90}$) obtained from values of a particle size distribution measurement of the positive electrode active material for lithium secondary batteries, the 50% cumulative particle diameter (D$_{50}$) is 5 μm or more and 20 μm or less, and Equation (B) shown below is satisfied, $$0.8 \leq (D_{90}-D_{10})/D_{50} \leq 1.5 \qquad (B).$$

7. The positive electrode active material for lithium secondary batteries according to claim 1, wherein x in Composition Formula (A) is 0<x<0.1.

8. The positive electrode active material for lithium secondary batteries according to claim 7, wherein a BET specific surface area of the positive electrode active material for lithium secondary batteries is 0.1 m$^2$/g or more and 2 m$^2$/g or less.

9. The positive electrode active material for lithium secondary batteries according to claim 7, wherein in a 10% cumulative particle diameter (D$_{10}$), a 50% cumulative particle diameter (D$_{50}$), and a 90% cumulative particle diameter (D$_{90}$) obtained from values of a particle size distribution measurement of the positive electrode active material for lithium secondary batteries, the 50% cumulative particle diameter (D$_{50}$) is 5 μm or more and 20 μm or less, and Equation (B) shown below is satisfied, $$0.8 \leq (D_{90}-D_{10})/D_{50} \leq 1.5 \qquad (B).$$

10. The positive electrode active material for lithium secondary batteries according to claim 7, wherein a tap density of the positive electrode active material for lithium secondary batteries is 1.7 g/cc or more and 3.3 g/cc or less.

11. A positive electrode for lithium secondary batteries comprising the positive electrode active material for lithium secondary batteries according to claim 1.

12. A lithium secondary battery comprising the positive electrode for lithium secondary batteries according to claim 11.

* * * * *